United States Patent [19]
Lisec

[11] Patent Number: 5,704,405
[45] Date of Patent: Jan. 6, 1998

[54] PROCESS AND APPARATUS FOR FILLING INSULATING GLASS PANES WITH HEAVY GAS

[76] Inventor: Peter Lisec, Bahnhofstrasse 34, A-3363 Amstetten-Hausmenig, Austria

[21] Appl. No.: 619,087

[22] Filed: Mar. 21, 1996

[30] Foreign Application Priority Data

Mar. 21, 1995 [AT] Austria ................... A 500/95

[51] Int. Cl.$^6$ ........................... E06B 3/66
[52] U.S. Cl. ............... 141/196; 141/4; 141/83; 141/197; 141/248
[58] Field of Search .................. 141/196, 197, 141/1, 4, 20, 83, 248, 3; 222/54, 55, 14, 21

[56] References Cited

U.S. PATENT DOCUMENTS

| | | | |
|---|---|---|---|
| 3,604,477 | 9/1971 | Grothoff | 141/20 |
| 4,886,095 | 12/1989 | Lisec | 141/4 |
| 4,921,022 | 5/1990 | Lisec | 141/129 |
| 4,999,976 | 3/1991 | Smith | 141/3 |
| 5,586,587 | 12/1996 | Leininger et al. | 141/196 |
| 5,588,472 | 12/1996 | Johnson | 141/83 |

FOREIGN PATENT DOCUMENTS

| | | |
|---|---|---|
| 0 276 647 | 8/1988 | European Pat. Off. |
| 0 324 333 | 7/1989 | European Pat. Off. |
| 31 01 342 | 7/1982 | Germany |
| 31 01342 | 7/1982 | Germany |
| 31 39 856 | 12/1982 | Germany |
| 31 39856 | 12/1982 | Germany |
| 39 41 430 | 6/1991 | Germany |
| 42 02612 | 8/1992 | Germany |
| 44 19052 | 12/1995 | Germany |
| 2 099 057 | 12/1982 | United Kingdom |

*Primary Examiner*—J. Casimer Jacyna
*Attorney, Agent, or Firm*—Young & Thompson

[57] ABSTRACT

For metering of heavy gas which is intended for use in filling insulating glass panes with heavy gas or in the assembly of heavy gas-filled insulating glass panes, heavy gas is introduced into A space (5) of a cylinder (1) whose internal space is divided by a piston (2) into two spaces (5 and 6), piston (2) moving as other space (6) becomes smaller, so that heavy gas flows out of the latter. The displacement path of piston (2) is measured by displacement sensor (7) and electronic rule (4). Furthermore, the temperature and pressure of the heavy gas flowing out of space (6) via connection (20) are measured and the displacement of piston (2) is interrupted as soon as the amount of heavy gas determined on the basis of the displacement path and the values of temperature and pressure of the discharging heavy gas corresponds to the required amount of heavy gas.

19 Claims, 2 Drawing Sheets

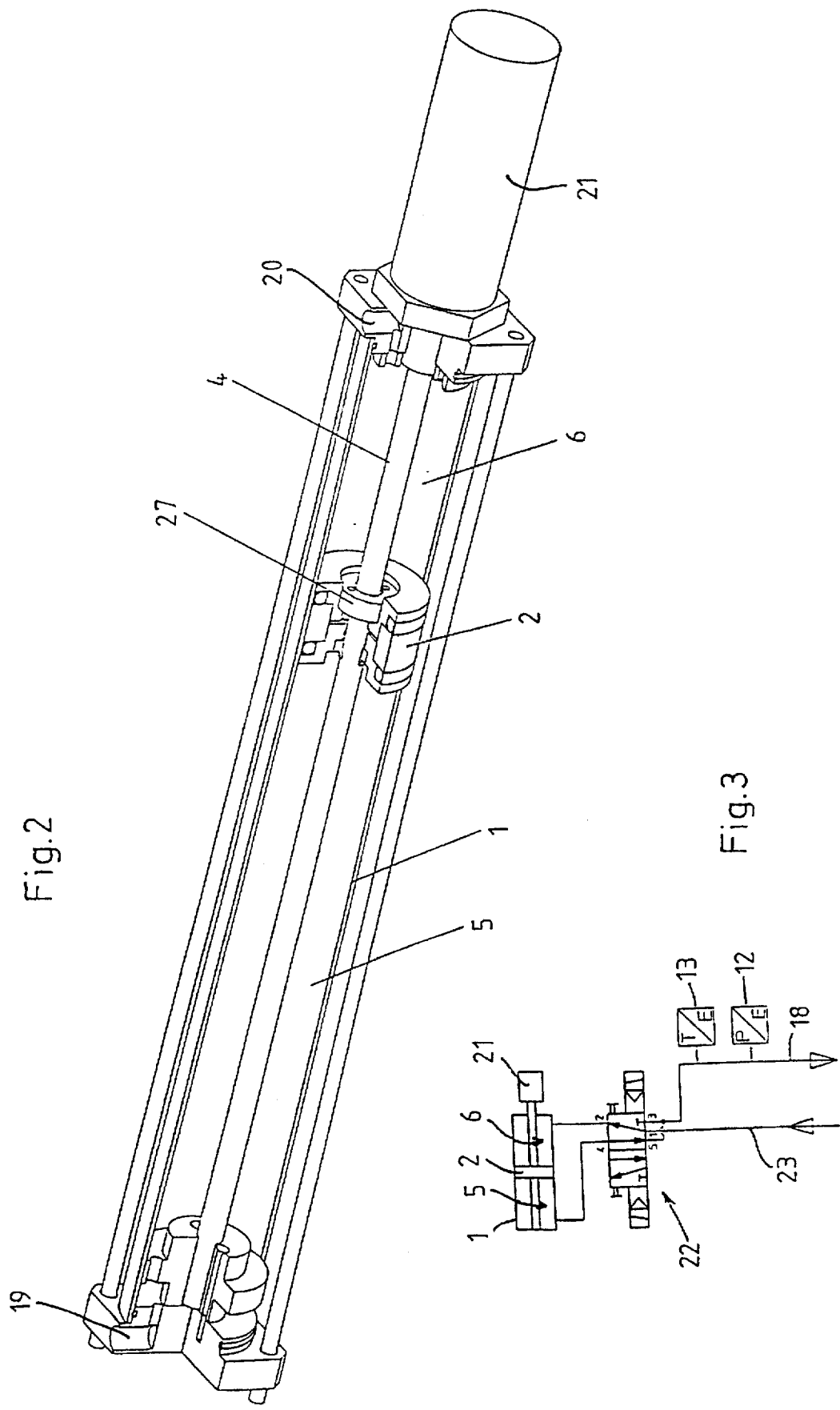

PROCESS AND APPARATUS FOR FILLING INSULATING GLASS PANES WITH HEAVY GAS

BACKGROUND OF THE INVENTION

The invention relates to a process and apparatus for filling insulating glass panes with heavy gas in an amount which is necessary for a one-time filling process, or a part of this amount.

Insulating glass panes are being increasingly filled with heavy gas (sulfur hexafluoride or an inert gas, such as argon or also xenon, for example) in order to improve their insulating properties.

For filling insulating glass panes with heavy gas various processes and devices (EP 0 276 647 A, EP 0 324 333 C) have become known, in which it has also been suggested that the insulating glass panes be filled with heavy gas not only after their assembly, but that they be assembled simultaneously filled with heavy gas (DE 31 39 856 A or DE 31 01 342 C).

Correctly metering the required amount of heavy gas is problematic in all known processes for production of insulating glass panes which have an internal space filled with heavy gas. Therefore it also often proceeds such that heavy gas is blown into the insulating glass pane or into the assembly station until the gas flowing out of the internal space of the insulating glass pane or that flowing out of the assembly station contains the desired proportion of heavy gas. Also when the insulating glass pane filled with heavy gas is being assembled is heavy gas supplied until the desired degree of filling has been reached; this is monitored by heavy gas sensors (gas sniffers).

In all known processes it is disadvantageous that they work with high gas losses; this is especially disadvantageous for expensive inert gases.

Introducing into the internal space of the insulating glass panes exactly the amount of heavy gas which corresponds to the desired degree of filling relative to the volume of the internal space of the insulating glass pane has already been proposed (EP 0 276 647 A). Any measures with which this heavy gas can be appropriately metered however are not named in EP 0 276 647 A.

From DE 39 41 430 A a measuring and metering device for liquid and gaseous media is known in which the movements of a piston are used in a piston-cylinder unit for metering the medium.

OBJECT OF THE INVENTION

The object of the invention is to devise a process with which heavy gas can be easily and accurately metered in the production of insulating glass panes which are filled with heavy gas, in which it should also be possible to match the amount of heavy gas measured at the time to the volume of the internal space of the insulating glass pane to be filled with heavy gas.

In the process according to the invention and with the device according to the invention, the amount of heavy gas which is needed for one filling process at a time or for one assembly process of an insulating glass pane which has an internal space filled with heavy gas is supplied in an exactly metered manner. Alternatively, with the device according to the invention a freely ascertainable known partial amount of the quantity required for a filling process or an assembly process can be metered as often as necessary for the entire process. In doing so the partial amounts can also be different.

BRIEF DESCRIPTION OF THE DRAWINGS

Other details and features of the process according to the invention and a device of the invention which is preferably suitable for executing the process follow from the following description using the drawings.

FIG. 2 in partially cutaway view one practical exemplary embodiment of a cylinder with the piston which can move in it according to the invention; and FIG. 3 shows a wiring diagram of one embodiment of the invention.

DETAILED DESCRIPTION OF THE INVENTION

Figure 1:
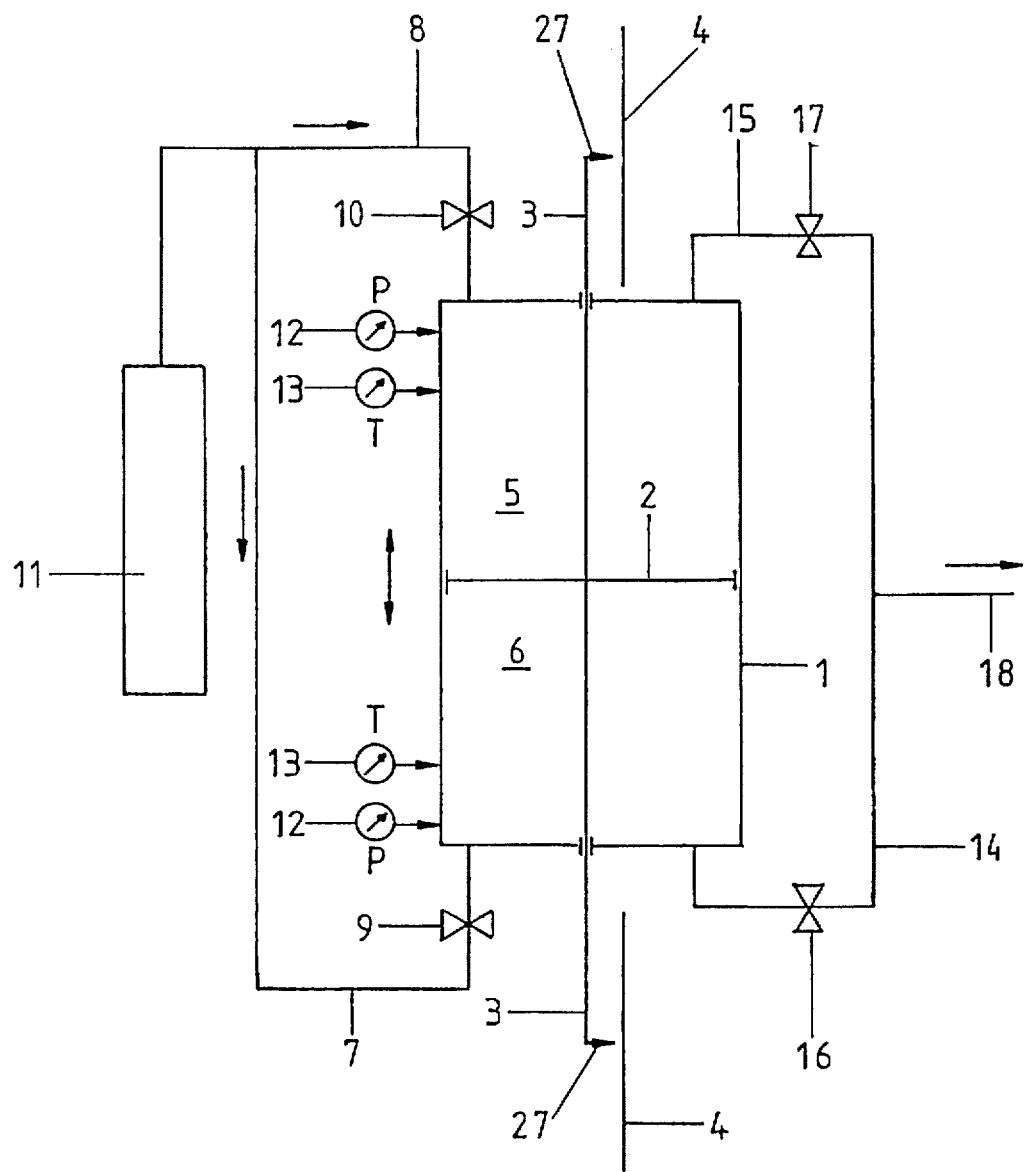
FIG. 1 shows in schematic form a first embodiment of a device according to the invention.

The device shown schematically in FIG. 1 has cylinder 1 in which piston 2 can move. Two rods 3 which are routed gas-tight out of cylinder 1 and which point in opposite directions are attached to this piston 2 and they are used to acquire the exact location of piston 2 which is characteristic of spaces 5, 6 using measuring means (for example, electronic rules 4). It goes without saying that the reach can be found with only one rod 3 and one rule 4.

Displacement sensors 27 which together with electronic rules 4 acquire the exact location of piston 2 in cylinder 1 and thus the size of spaces 5 and 6 are attached to the ends of rods 3 (or one rod 3).

Gas feed lines 7, 8 via which heavy gas with which an insulating glass pane is to be filled is supplied from heavy gas source 11 lead into two spaces 5 and 6 in cylinder 1 which are separated from one another by piston 2. There are shutoff elements 9, 10 in two lines 7, 8. Furthermore, device 12 for acquiring the pressure and device 13 for acquiring the temperature of the heavy gas contained in this space 5, 6 are assigned to each space 5, 6.

From two spaces 5, 6 lines 14, 15 in which there are likewise shutoff elements 16, 17 lead to line 18 which leads to a device for filling insulating glass panes with heavy gas or to an assembly station in which the heavy gas-filled insulating glass panes can be assembled.

The device just described operates as follows:

When shutoff element 10 is open and shutoff elements 9, 16 and 17 are closed, heavy gas from gas source 11 is supplied via line 8 to space 5. In this case the pressure in the heavy gas rises in space 5 in cylinder 1 and piston 2 moves as space 5 grows larger and as the compression of the heavy gas contained in other space 6 of cylinder 1 increases. The pressure which prevails in space 5 and the temperature are measured by the measuring devices and the location of piston 2 is acquired by rule 4 which is assigned to piston rod 3.

As soon as the size of space 5 and the pressure which prevails in it as well as the temperature correspond to the stipulated amount of heavy gas which is necessary for one filling process (or a known fraction of this amount), shutoff element 10 is closed and shutoff element 17 is opened. As piston 2 moves the heavy gas is routed out of space 5 and via line 15 to line 18 to the filling station or assembly station where an insulating glass pane is filled with heavy gas or a heavy-gas filled insulating glass pane is assembled.

The displacement of piston 2 for pressing heavy gas out of space 5 can take place by introducing the heavy gas into other space 6 with shutoff element 9 now opened.

It is also possible to proceed such that piston 2 is displaced into one of its two end positions on the front end of cylinder 1 at a time before heavy gas is added to space 5 or 6 which occupies essentially the entire internal space of the cylinder.

Instead of the described device with movable piston 2 which divides the internal space of cylinder 1 into two spaces 5, 6 which are available for metering of heavy gas, a simplified embodiment with only one space of measured heavy gas made available for metering can be provided in which to movable piston 2 is assigned a drive device in order to move it after completed filling of the (single) space with the amount of heavy gas desired at the time for pressing out the heavy gas from the space.

One embodiment with movable piston 2 and two spaces 5, 6 available for metering of heavy gas in cylinder 1 however has the advantage that it is possible to work almost continuously since only one of two spaces 5, 6 is ever filled with an accurately measured amount of gas and is available for a filling process or an assembly process of an insulating glass pane.

It is apparent that with the approach described amounts of heavy gas can be exactly metered based on the acquired values for temperature and pressure and the volume of the space, at the same time the amount depends solely on temperature/pressure and displacement path (location) of the piston, since all other factors which determine the volume of heavy gas are constants (physical constants of the heavy gas and device).

In the practical embodiment (partially cut away) shown in FIG. 2 there is piston 2 which divides the internal space of cylinder 1 into two spaces 5 and 6. In the embodiment shown in FIG. 2 rule 4 is accommodated in the interior of cylinder 1 and there is displacement sensor 27 on piston 2. Outside of cylinder 1 evaluation device 21 is attached for determining the position of piston 2 within cylinder 1. Two spaces 5 and 6 are connected via connections 19 and 20 respectively to the heavy gas feed lines which in the embodiment shown (see also FIG. 3) can at the same time be the heavy gas discharge lines (lines 7 and 14 as well as lines 8 and 15 are then each combined into a single line).

The embodiment of the device shown in FIG. 2 can, as is shown in the wiring diagram of FIG. 3, be filled with heavy gas or heavy gas can be supplied from it to a gas filling station or assembly station.

In the embodiment shown in FIG. 3 shutoff elements 9, 10, 16, 17 are combined into a multipath shutoff element 22. In the position of shutoff element 22 shown in FIG. 3 the heavy gas supplied via line 23 from heavy gas source 11 is introduced into space 6 of cylinder 1 via connections 1, 2 of multipath shutoff element 22, piston 2 moving increasingly as space 5 becomes smaller. Therefore heavy gas from space 5 is supplied via connections 4 and 5 of multipath shutoff element 22 to line 18, in the embodiment shown temperature sensor 13 and pressure sensor 12 being assigned to line 18. As soon as on the basis of the displacement path of piston 2 under the action of the heavy gas introduced into space 6 and with consideration of the temperature measured by temperature sensor 13 and of the pressure acquired by pressure sensor 12 it has been ascertained that the required amount of heavy gas (or a specific partial amount) has flowed through line 18 to the downstream device, the supply of heavy gas into space 6 is interrupted, multipath shutoff element 22 is adjusted so that in a subsequent step by supplying heavy gas into space 5 and moving piston 2 in cylinder 1, as space 6 becomes smaller, heavy gas from the latter can be again removed in the exactly metered amount and can be supplied to a downstream device.

The manner of operation of the device which is described above for the embodiment shown in FIGS. 2 and 3 can also be used in the embodiment shown in FIG. 1 and vice versa.

In summary the invention can be described for example as follows.

For metering of heavy gas which is intended for use in filling insulating glass panes with heavy gas or in the assembly of heavy gas-filled insulating glass panes, heavy gas is introduced into space 5 of cylinder 1 with internal space divided by piston 2 into two spaces 5 and 6, piston 2 moving as other space 6 becomes smaller so that heavy gas flows out of the latter. The displacement path of piston 2 is acquired by displacement sensor 7 and electronic rule 4. Furthermore, the temperature and pressure of the heavy gas flowing out of space 6 via connection 20 are acquired and the displacement path of piston 2 is interrupted as soon as the amount (volume) of heavy gas determined on the basis of the displacement path and the values of temperature and pressure of the discharging heavy gas corresponds exactly to the required amount of heavy gas.

I claim:

1. Process for filling insulating glass panes with heavy gas, comprising introducing heavy gas into a space which can be made larger or smaller, detecting the temperature and pressure of the gas in said space, continuing to introduce gas into said space whilst making the space progressively larger, until the volume and temperature and pressure of the gas in the space reach predetermined values corresponding to a predetermined amount of gas to be introduced into an insulating glass pane and thereupon halting the increase in the volume of the space, and thereafter introducing heavy gas from said space into a said insulating glass pane.

2. Process as claimed in claim 1, wherein said introducing is effected by reducing the size of the space.

3. Process as claimed in claim 2, wherein the change of volume of said space is effected by moving a piston which partially bounds said space.

4. Process as claimed in claim 3, and moving said piston to increase the volume of said space by action of the pressure of the heavy gas introduced into said space.

5. Process as claimed in claim 4, wherein two said spaces are provided on opposite sides of said piston in a cylinder in which said piston reciprocates, and enlarging by movement of the piston one said space whilst the other said space decreases in volume.

6. Process as claimed in claim 5, wherein heavy gas is discharged from said other space at the same time that heavy gas is introduced into said one space.

7. Process as claimed in claim 3, and detecting the position of said piston to measure said volume.

8. Process as claimed in claim 7, and halting the movement of the piston when said predetermined amount of heavy gas has been discharged from said other space.

9. Apparatus for filling insulating glass panes with heavy gas, comprising a cylinder (1), a piston (2) movably mounted in the cylinder, means (7, 8) for supplying heavy gas from a source (11) of heavy gas to said cylinder, means (12, 13) for measuring the temperature and pressure of the gas in the cylinder, means (4, 27) for measuring the position of the piston in the cylinder thereby to measure the volume of the cylinder on at least one side of the piston (2), and means (14, 15) for discharging heavy gas from the cylinder when said temperature and pressure and measured volume correspond to a desired amount of heavy gas to be discharged from the cylinder into an insulating glass pane.

10. Apparatus as claimed in claim 9, and means (9, 10) for moving the piston (2) to eject said gas from said space (5, 6).

11. Apparatus as claimed in claim 9, the piston being double acting and there being a said space on either side of the piston whereby the piston acts to eject gas from one said space at the same time that gas is introduced into the other said space.

12. Apparatus according to claim 11, and a single conduit (18) for receiving gas alternately from each of said two spaces (5, 6).

13. Apparatus as claimed in claim 11, said supplying means (7, 8) comprising two conduits (7, 8) leading from said heavy gas source (11) one to each of said two spaces (5, 6).

14. Apparatus according to claim 11, there being a said temperature measuring means (13) and pressure measuring means (12) individual to each of said two spaces (5, 6).

15. Apparatus according to claim 9, further comprising a multipath valve (22) leading from said heavy gas source (11) and to said discharging means (14, 15).

16. Apparatus as claimed in claim 15, said temperature and pressure measuring means (12, 13) being located in a conduit (18) downstream of said multipath valve (22).

17. Apparatus as claimed in claim 9, said piston (2) having a piston rod (3) which extends outside of said cylinder (1) and which bears on its end outside said cylinder (1) a displacement sensor (27) that moves along a fixed rule (4) to measure the position of said piston (2).

18. Apparatus as claimed in claim 9, wherein said position measuring means (4, 27) are located inside said cylinder (FIG. 2).

19. Apparatus as claimed in claim 18, wherein said position measuring means (4, 27) comprises a rule (4) disposed coaxially within the cylinder and a displacement sensor (27) carried by said piston.

* * * * *